United States Patent [19]

Ueda

[11] Patent Number: 4,557,602
[45] Date of Patent: Dec. 10, 1985

[54] EDGE DETECTOR IN OPTICAL MEASURING INSTRUMENT

[75] Inventor: Morimasa Ueda, Kanagawa, Japan

[73] Assignee: Mitutoyo Mfg. Co., Ltd., Tokyo, Japan

[21] Appl. No.: 481,640

[22] Filed: Apr. 4, 1983

[30] Foreign Application Priority Data

Apr. 5, 1982 [JP] Japan ................................ 57-56372

[51] Int. Cl.$^4$ ........................................... G01N 21/30
[52] U.S. Cl. ................................... 356/372; 356/375; 356/384
[58] Field of Search ............... 356/121, 372, 375, 384, 356/385, 386, 387; 256/560, 202

[56] References Cited

U.S. PATENT DOCUMENTS 3,467,473  9/1969  Preston .............................. 356/121
3,697,761  10/1972 Kamachi ............................ 250/202
4,142,105  2/1979  Erdmann ........................... 250/560

Primary Examiner—R. A. Rosenberger
Attorney, Agent, or Firm—Koda and Androlia

[57] ABSTRACT

An edge detector in an optical measuring instrument, for detecting a transmitted light or reflected light to directly or indirectly measure dimensions of an object being measured, comprising:

a sensor including four light receiving elements provided on a plane substantially in parallel with a plane of relative movement between the sensor and said object being measured, whereby at least two sets of phase shift signals are generated in accordance with brightness and darkness generated during said relative movement; a first and a second operational means for calculating differences between the sets of said phase shift signals; a third operational means for calculating a difference between output signals emitted from said first and second operational means and a fourth operational means for calculating a sum of said output signals; and a detecting means for emitting a crossing signal when an output signal from said third operational means is on a reference level, and when an output signal from said fourth operational means is above said reference level.

16 Claims, 10 Drawing Figures

EDGE DETECTOR IN OPTICAL MEASURING INSTRUMENT

BACKGROUND OF THE INVENTION

1. Field of the Invention

This invention relates to an edge detector in an optical measuring instrument for measuring dimensions, displacement values and the like of an opaque body, and more particularly to an edge detector in an optical measuring instrument, wherein an opaque object being measured is directly illuminated by scanning ray beams, a reflected light or a transmitted light due to this illumination, or an image of projection of the object being measured due to the reflected light or the transmitted light are received by photoelectric elements, where electric signals are taken out, and the measurement of dimensions, the judgment of position, the discrimination of contour and the like of the object being measured are carried out in response to the aforesaid electric signals.

2. Description of the Prior Art

Heretofore, the optical measuring instrument of this type such for example as the projector has been of such an arrangement that the object being measured is rested on a mount and illuminated by parallel ray beams, an image of projection of the object being measured is made to focus on a screen by a transmitted light or a reflected light of the parallel ray beams, and the dimensions, contour and the like of the object being measured. However, in general, so-called blurs are found at the edges of the image of the object being measured, which has been projected on the screen. In consequence, it is difficult to accurately read a measured value from the coincidence between the image formed on the screen and a hair line.

To obviate the above-described disadvantage, heretofore, such a method has been adopted that the edge of the formed image is moved relative to a photoelectric element, whereby a variation in value of an electric signal emitted from the photoelectric element is obtained from a variation in ratio of area between a bright portion and a dark portion of the image projected on a light receiving plane of the photoelectric element, so that the variation in the value of the electric signal is compared with a reference voltage, so that the edges of the image of projection can be detected.

However, the above-described method presents the disadvantage that interferences such as external irregular lights affect the performance of the projector to a great extent and the measuring accuracy is greatly deteriorated due to variations in the signal obtained from the photoelectric element and in the reference voltage.

Further, there has been adopted another method wherein a photoelectric element is moved relative to the border or edge of the image projected on the screen, an output signal thus obtained is subjected to second derivative to obtain a wave-form signal, whereby the wave-form signal is compared with a reference voltage to detect the edge. However, this method presents the disadvantages that the position of the edge thus detected may differ depending on the value of the relative movement rates between the photoelectric element and the image of projection, and further, the measuring accuracy is greatly affected by a variation in the reference voltage similarly to the former method.

There has been adopted a still further method, wherein there are provided two photoelectric elements, which are moved relative to the edge of the image of projection, whereby wave-form signal are obtained from a plurality of output signals thus obtained, so that the wave-form signals are compared with the reference voltage to detect the edge. However, this method presents the disadvantages that the measurement becomes very instable due to a relative variation between the output signals obtained from the photoelectric elements and the reference voltage and a variation of the level similar to the above-described methods, further, the scope of application of the illumination ray beams to light intensity is small, and a sensor portion or a circuit portion becomes complicated in construction.

Particularly, in the projector, the brightness of the image projected on the screen is varied due to the fatigue of a light source lamp for illumination, the characteristics of lenses in a projection system and the external irregular lights, and furthere, the brightness suitable for working is varied depending on the color of the pupil of the eye of the measurer (which is different from one race to another) for example, as one of the conditions on the part of measureres, and hence, the brightness must be suitably selected. However, the small scope of application of the illumination ray beams to light intensity results in lowered capacity of the projector.

Furthermore, according to the conventional edge detecting methods, when the focus of the image of projection is shifted, the wave forms emitted from the photoelectric element or elements become gently sloped, thereby presenting the disadvantage that no accurate edge can be detected.

This disadvantage is common in the edge detection among the optical measuring instruments wherein, in general, a transmitted light or a reflected light is detected to directly or indirectly measure dimensions and the like of an object being measured.

SUMMARY OF THE INVENTION

It is therefore the primary object of the present invention to provide an edge detector in an optical measuring instrument, being free from being affected by the light intensity at which the object being measured is illuminated, interferences such as external irregular lights and variations in an output signal emitted from a photoelectric element or elements and in the reference voltage, and capable of detecting the edge of an object being measured, with simplified construction.

Another object of the present invention is to provide an edge detector in an optical measuring instrument, wherein, in a projector, even if there is a shift in focal point of an image of projection for example, the edge of an object being measured can be accurately detected.

A further object of the present invention is to provide an edge detector in an optical measuring instrument, wherein an analog signal or signals from a photoelectric element or elements are directly processed, so that the edge of an object being measured can be detected.

To achieve one of the above-described objects, the present invention contemplates that, in an edge detector in an optical measuring instrument, wherein a transmitted light or a reflected light is detected to directly or indirectly measure the dimensions of an object being measured, the edge detector comprises: a sensor including four light receiving elements provided on a plane substantially in parallel with a plane of relative movement between the sensor and the object being measured, whereby at least two sets of phase shift signals are generated in accordance with brightness and darkness generated during the relative movement; a first and a seconed operational means for calculating differences between the sets of the phase shift signals; a third operational means for calculating a difference between output signals emitted from the first and second operational means and a fourth operational means for calculating a sum of the output signals; and a detecting means for emitting a cross signal of an output signal from the third operational means with a reference level, the cross signal being generated when an output signal form the fourth operational means is on a predetermined level.

To achieve one of the above-described objects, the present invention comtemplates that, in the aforesaid edge detector in the optical measuring instrument, the four light receiving elements in the sensor are arranged such that two light receiving elements are disposed on each of two straight lines perpendicularly intersecting each other and at opposite sides of the intersection, respectively.

To achieve one of the above-described objects, the present invention contemplates that, in the aforesaid edge detector in the optical measuring instrument, the sensor is two-dimensionally movable relative to the object being measured.

To achieve one of the above-described objects, the present invention contemplates that, in the aforesaid edge detector in the optical measuring instrument, an effective detection region of the first and second operational means is set by outputs emitted from the fourth operational means.

To achieve one of the above-described objects, the present invention contemplates that, in the aforesaid present invention contemplates that, in the aforesaid edge detector in the optical measuring instrument, the sensor is provided on a screen of a projector, on which an image of projection of the object being measured is made to focus.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION EMBODIMENT

Figure 1:
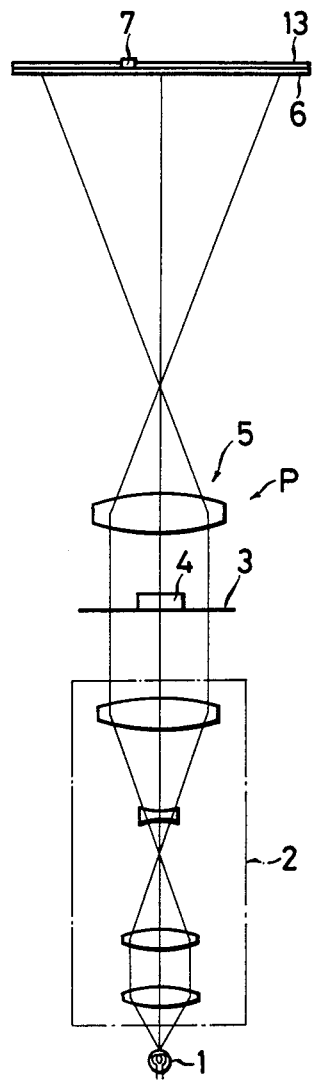
FIG. 1 is a diagram of an optical system showing one embodiment wherein the edge detector in the optical measuring instrument according to the present invention is applied to a projector.

Detailed description will hereunder be given of an embodiment of the present invention with reference to the drawings.

In this embodiment, the present invention is applied to a projector. As shown in FIGS. 1 through 4, in an edge detector in a projector P, wherein an object 4 being measured, which is rested on a mount 3, is illuminated by a light from a light source lamp 1 from below the mount 3 through a condenser lens 2 or from above the mount 3 through another light path, and an image 4A of projection of the object 4 being measured is made to focus on a screen 6 by a transmitted light or a reflected light of the illumination through a projecting lens 5, whereby the image of projection is used to indirectly measure the dimensions and the like of the object 4 being measured, the edge detector comprises: a sensor 7 including four light receiving elements 7A, 7B, 7C and 7D provided on a plane substantially in parallel with a plane of relative movement between the sensor 7 and the image 4A as an object being measured, whereby at least two sets of phase shift signals are generated in accordance with brightness and darkness generated during the relative movemesnt; a first and a second operational means 8 and 9 for calculating differences between the sets of the phase shift signals; a third operational means 10 for calculating a difference between output signals emitted from the first and the second operational means 8 and 9 and a fourth operational means 11 for calculating a sum of the output signals; and a detecting means 12 for emitting a cross signal of an output signal from the third operational means 10 with a reference level, the cross signal being generated when an output signal from the fourth operational means 11 is on a predetermined level.

As shown in FIG. 1, the aforesaid sensor 7 is integrally formed with a transparent plate 13 rested on the upper surface of the screen 6 of the projector P in a manner to be slidable and in parallel with the sensor 7.

Additionally, the four light receiving elements 7A through 7D in the sensor 7 are arranged such that two light receiving elements are disposed on each of two straight lines, i.e., an X and a Y axis perpendicularly intersecting each other and at opposite sides of the intersection, respectively.

The light receiving elements 7A through 7D are arranged on the X axis and the Y axis such that the light receiving elements 7A and 7D are disposed on the X axis, and the light receiving elements 7B and 7C are disposed on the Y axis, interposing the intersection of the X axis and the Y axis. Electrical connections are made such that output signals from the light receiving elements 7A and 7B are fed to the first operational means 8 and output signals from the light receiving elements 7C and 7D are fed to the second operational means 9.

The aforesaid transparent plate 13 is movable together with the sensor 7 along the X axis or the Y axis.

Figure 2:
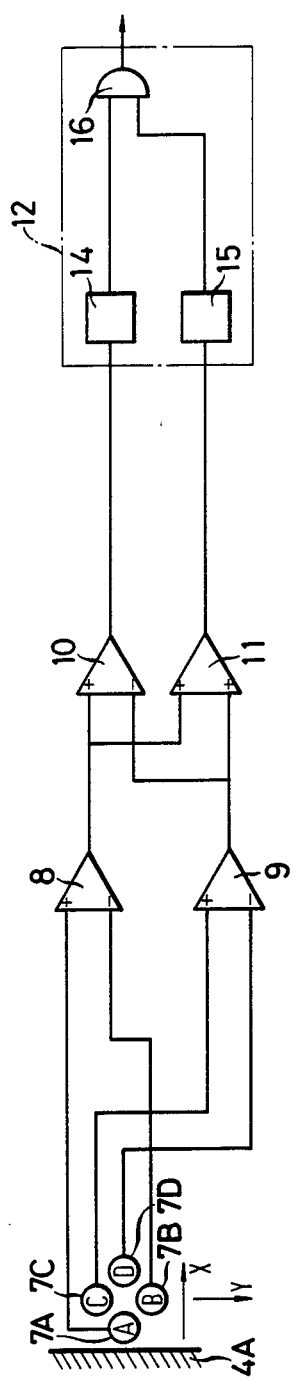
FIG. 2 is a block diagram showing the arrangement of the above embodiment.

As shown in FIG. 2, the detecting means 12 comprises: a discriminator circuit 14 for discriminating whether an output signal from the third operational means 10 is on a reference level or not and emitting a signal when the output signal is on the reference level; a discriminator circuit 15 for discriminating whether an output signal from the fourth operatinal means 11 is above a predetermined value or not and emitting a signal when the output signal is above the predetermined value; and an AND circuit 16 for emitting a cross signal when output signals are simultaneously fed from the discriminator circuits 14 and 15 thereto.

Description will now be given of action of the above embodiment.

The sensor 7 is moved relative to the image 4A of projection of the object 4 being measured, which has been made to focus on the screen 6, along the X axis and the Y axis on the screen 6, whereby the edge of the image 4A of projection traverses the sensor 7.

Figures 3A, 3B, 3C, 3D, 3E:
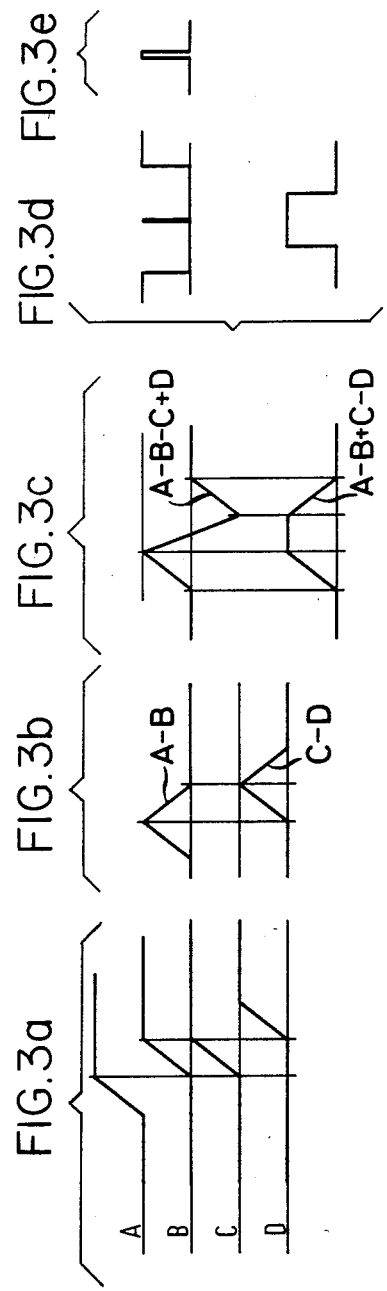
FIGS. 3(a) through 3(e) are graphic charts showing the process of the signal processing in the above embodiment.

For example, when the images 4A of projection approaches the sensor 7 along the X axis from the side of the light receiving element 7A as shown in FIG. 2 and traverses the sensor 7, output signals emitted from the light receiving elements 7A through 7D become signals shifted in phase along the time axis as indicated by reference numerals A through D in FIG. 3 (There is no phase shift between B and C). These output signals are calculated into A-B and C-D by the first operational means 8 and the second operational means 9 and emitted, respectively, as shown in FIG. 3(b).

A difference between these output signals A-B and C-D is calculated by the third operational means 10, a sum of these output signals is calculated by the fourth operational means 11, and resultant output signals thus calculated are as shown in FIG. 3(c).

The output signal emitted from the third operational means 10 is fed to the discriminator circuit 14, which in turn emits a digital signal "1" when the output signal emitted from the third operational means 10 is "0" as shown in FIG. 3(d).

The output signal emitted from the fourth operational means 11 is fed to the discriminator circuit 15, which in turn emits a digital signal "1" when the level of the output signal is above a predetermined value.

The output signals emitted from these discriminator circuits 14 and 15 are fed to the AND circuit 16, which in turn emits pulse signals of 10 μSec. for example when the both output signals emitted from the discriminator circuits 14 and 15 are "1", as shown in FIG. 3(e), and, at this time, detects the edge of the image 4A of projection.

In consequence, in this embodiment, the four light receiving elements 7A through 7D are combined together so as to take out two sets of the phase shift signals, the differences therebetween are calculated, and the signals of the differences are processed to obtain the edge of the image 4A of projection. Consequently, the adverse influence of the great valuations in value of the output signals emitted from the light receiving elements 7A through 7D can be offset, and the adverse influence of the relative variation on level of the reference voltage for detecting edge can be obviated. Additionally, in this embodiment, since the signal obtained by the fourth operational means 11 is used as a gate signal, such an advantage can be offered that edge pulse signals are obtainable from the AND circuit 16 only in a effective detection region. Furthermore, in this embodiment, since the output signals obtained from the light receiving elements 7A through 7D are processed by mere the subtraction and addition, such an advantage can be offered that the output signals can be processed in the state of analogue signals.

The output signals emitted from the four light receiving elements can be turned into wave-form signals by two subtractions, and the gradients can be made large. In consequence, even if the image of projection is shifted in its focal point, the edge of the image of projection can be accurately detected.

Since the respective pairs of light receiving elements are arranged on the X axis and the Y axis, interposing the intersection of the X axis and the Y axis perpendicularly intersecting each other, the edge of the image of projection can be detected both on the X axis and the Y axis simultaneously, and the edge can be determined by the point determined by the positional relationship between the four light receiving elements, i.e., the intersection of the X axis with the Y axis, such an advantage can be offered that the adverse influence of the sensor 7 on the image 4A of projection in the direction of relative movement is made very small.

According to the experiments conducted by the present invention, in the projector, they were able to detect the edge even when the brightness of the bright portion of the image projected on the screen was only about 1 lux.

In the above embodiment, the four light receiving elements 7A through 7D in the sensor 7 are arranged such that one pair of light receiving elements are disposed on the X axis on the screen 6 and the other pair of light receiving elements are disposed on the Y axis, interposing the intersection of the X axis and the Y axis. However, these pairs of light receiving elements may be disposed at positions being shifted from the X and Y axes, interposing the intersection, without being accurately arranged on the X and Y axes. Additionally, it does not matter if the positions of the light receiving elements are shifted in the direction of rotation, being centered about the intersection.

Figure 4:
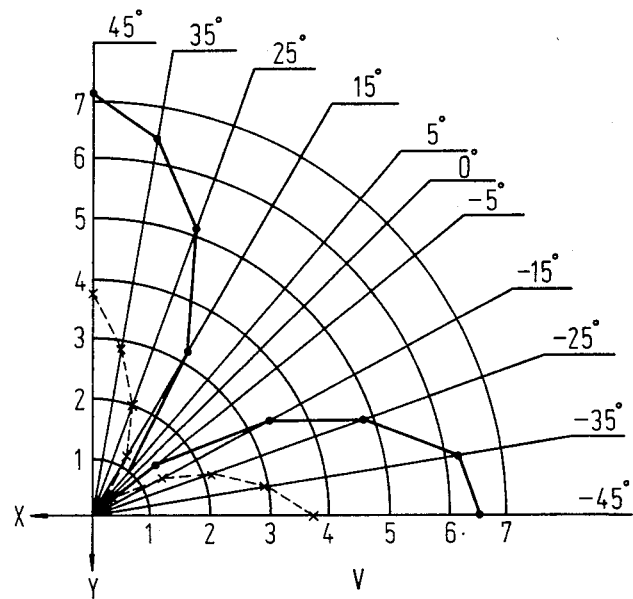
FIG. 4 is a graphic chart showing the effects achieved by the above embodiment.

For example, according to the experiments conducted by the present inventors, as shown in FIG. 4, although there were found lowered outputs to a certain extent, outputs sufficient for measuring were obtained, except that the positions of the light receiving elements were shifted through 45° with respect to the X and Y axes (The solid lines indicate the outputs shown by wave forms and the upper stage in FIG. 3(c), and the chain lines indicate the output shown at the lower stage, i.e., the gate outputs).

Figure 5:
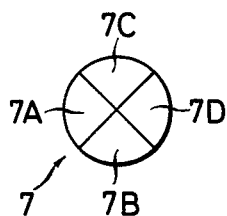
FIGS. 5 and 6 are plan views showing another embodiment of the arrangement of the light receiving elements in the sensor according to the present invention.
Figure 6:
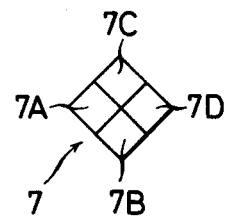

In the above embodiment, the light receiving elements 7A through 7D are disposed independently of each other and in a cross fashion. However, as shown in FIGS. 5 and 6, the light receiving elements may be arranged in the respective quadrants or in the respective square parts formed by rectangular coordinate axes on a plane square surface.

In the above embodiment, the sensor 7 is moved relative to the image 4A of projection. However, this arrangement may be replaced by one in which, for example, the mount 3 is moved, whereby the image 4A of projection is moved relative to the sensor 7.

The above embodiment is of such an arrangement that, in the projector, the edge of the image projected on the screen is measured. However, the present invention need not necessarily be limited to the above arrangement, but, is commonly applicable to the edge detector in the optical measuring instrument for detecting the transmitted light or the reflected light to thereby directly or indirectly measure the dimensions of the object being measured.

In consequence, the present invention is applicable to an edge detector in an optical measuring instrument and the like, wherein, for example, a main scale and an index scale, on both of which are formed optical lattices, are moved relative to each other, whereby an object being measured is parallelly scanned by a photoelectric length measurer for photoelectrically measuring to dimensions and the like, or laser ray beams or the like, so that the dimensions and the like of the object being measured can be measured from the bright portion and the dark portion.

It should be apparent to those skilled in the art that the abovedescribed embodiments are merely representative, which represent the applications of the principles of the present invention. Numerous and varied other arrangements can be readily devised by those skilled in the art without departing from the spirit and the scope of the invention.

What is claimed is:

1. An edge detector in an optical measuring instrument, for detecting a transmitted light or reflected light to directly or indirectly measure dimensions of an object being measured, comprising:
a sensor including four light receiving elements provided on a plane substantially in parallel with a plane of relative movement between the sensor and said object being measured, whereby at least a first and second set of phase shift signals are generated by said sensor in accordance with brightness and darkness generated during said relative movement, each of said first and second sets comprising at least two signals of different phase; a first and a second operational means for calculating respectively differences between the two signals of the first and second sets of said phase shift signals; a third operational means for calculating a difference between output signals emitted from said first and second operational means; a fourth operational means for calculating a sum of said output signals of said first and second operational means; and a detecting means for generating a crossing signal when an output signal from said third operational means is on a reference level and when an output signal from said fourth operational means is above said reference level.

2. An edge detector in an optical measuring instrument as set forth in claim 1, wherein said four light receiving elements in the sensor are arranged such that two light receiving elements are disposed on each of two straight lines perpendicularly intersecting each other and at opposite sides of the intersection, respectively.

3. An edge detector in an optical measuring instrument as set forth in claim 2, wherein said sensor is two-dimensionally movable relative to said object being measured.

4. An edge detector in an optical measuring instrument as set forth in claim 3, wherein an effective detection region of said first and second operational means is set by outputs emitted from said fourth operational means.

5. An edge detector in an optical measuring instrument as set forth in claim 4, wherein the sensor is provided on a screen of a projector, on which an image of projection of the object being measured is made to focus.

6. An edge detector in an optical measuring instrument as set forth in claim 3, wherein the sensor is provided on a screen of a projector, on which an image of projection of the object being measured is made to focus.

7. An edge detector in an optical measuring instrument as set forth in claim 2, wherein an effective detection region of said first and second operational means is set by outputs emitted from said fourth operational means.

8. An edge detector in an optical measuring instrument as set forth in claim 7, wherein the sensor is provided on a screen of a projector, on which an image of projection of the object being measured is made to focus.

9. An edge detector in an optical measuring instrument as set forth in claim 2, wherein the sensor is provided on a screen of a projector, on which an image of projection of the object being measured is made to focus.

10. An edge detector in an optical measuring instrument as set forth in claim 1, wherein said sensor is two-dimensionally movable relative to said object being measured.

11. An edge detector in an optical measuring instrument as set forth in claim 10, wherein an effective detection region of said first and second operational means is set by outputs emitted from said fourth operational means.

12. An edge detector in an optical measuring instrument as set forth in claim 11, wherein the sensor is provided on a screen of a projector, on which an image of projection of the object being measured is made to focus.

13. An edge detector in an optical measuring instrument as set forth in claim 10, wherein the sensor is provided on a screen of a projector, on which an image of projection of the object being measured is made to focus.

14. An edge detector in an optical measuring instrument as set forth in claim 1, wherein an effective detection region of said first and second operational means is set by outputs emitted from said fourth operational means.

15. An edge detector in an optical measuring instrument as set forth in claim 14, wherein the sensor is provided on a screen of a projector, on which an image of projection of the object being measured is made to focus.

16. An edge detector in an optical measuring instrument as set forth in claim 1, wherein the sensor is provided on a screen of a projector, on which an image of projection of the object being measured is made to focus.

* * * * *